(12) United States Patent
Chen et al.

(10) Patent No.: US 10,205,194 B2
(45) Date of Patent: Feb. 12, 2019

(54) HIGHLY ION-CONDUCTIVE NANO-ENGINEERED POROUS ELECTROLYTIC COMPOSITE MEMBRANE FOR ALKALINE ELECTROCHEMICAL ENERGY SYSTEMS

(71) Applicants: Zhongwei Chen, Waterloo (CA); Michael Fowler, Waterloo (CA); Hadis Zarrin, Kitchener (CA)

(72) Inventors: Zhongwei Chen, Waterloo (CA); Michael Fowler, Waterloo (CA); Hadis Zarrin, Kitchener (CA)

( * ) Notice: Subject to any disclaimer, the term of this patent is extended or adjusted under 35 U.S.C. 154(b) by 630 days.

(21) Appl. No.: 14/600,585

(22) Filed: Jan. 20, 2015

(65) Prior Publication Data

US 2015/0132661 A1    May 14, 2015

Related U.S. Application Data

(63) Continuation of application No. PCT/CA2013/050569, filed on Jul. 19, 2013.
(Continued)

(51) Int. Cl.
  *H01M 10/26*  (2006.01)
  *H01M 8/10*  (2016.01)
  (Continued)

(52) U.S. Cl.
  CPC ........... *H01M 10/26* (2013.01); *C08J 5/2256* (2013.01); *C08J 9/0071* (2013.01); *C08J 9/28* (2013.01);
  (Continued)

(58) Field of Classification Search
  None
  See application file for complete search history.

(56) References Cited

U.S. PATENT DOCUMENTS

| 3,821,127 A | 6/1974 | Mizutani et al. |
| 4,190,707 A * | 2/1980 | Doi .......................... C08J 9/26 264/49 |

(Continued)

FOREIGN PATENT DOCUMENTS

| GB | 2005289 A * | 4/1979 | .......... H01M 2/1646 |
| WO | WO2005/057700 A1 | 6/2005 | |

(Continued)

OTHER PUBLICATIONS

Chen et al., Development of octadecyl-functionalized-nanotubular TiO2/Ti wire solid-phase microextraction fiber, Nov. 2012, Analyst, 138, 569-575.*

(Continued)

*Primary Examiner* — Daniel S Gatewood
(74) *Attorney, Agent, or Firm* — Santosh K. Chari; Blake, Cassels & Graydon LLP

(57) ABSTRACT

A porous electrolytic composite membrane for electrochemical energy systems, such as alkaline fuel cells, metal-air batteries and alkaline electrolyzers, comprises a porous polymeric material and nanomaterials. The polymeric material is preferably polybenzimidazole (PBI). The nanomaterials are preferably functionalized or non-functionalized. The nanomaterials are preferably titania nanotubes and/or graphene oxide nanosheets. The membrane further comprises an electrolyte solution, such as KOH. A method of preparing the membrane is also provided.

7 Claims, 4 Drawing Sheets

Related U.S. Application Data

(60) Provisional application No. 61/741,456, filed on Jul. 20, 2012.

(51) Int. Cl.

| | |
|---|---|
| *H01M 8/106* | (2016.01) |
| *H01M 8/1062* | (2016.01) |
| *H01M 8/1069* | (2016.01) |
| *H01M 8/08* | (2016.01) |
| *H01M 8/083* | (2016.01) |
| *H01M 12/04* | (2006.01) |
| *C08J 9/28* | (2006.01) |
| *C08J 9/40* | (2006.01) |
| *C08J 5/22* | (2006.01) |
| *C25B 13/08* | (2006.01) |
| *C08J 9/00* | (2006.01) |

(52) U.S. Cl.
CPC ............... *C08J 9/40* (2013.01); *C25B 13/08* (2013.01); *H01M 8/083* (2013.01); *H01M 8/106* (2013.01); *H01M 8/1062* (2013.01); *H01M 8/1069* (2013.01); *H01M 12/04* (2013.01); *C08J 2379/06* (2013.01); *H01M 2300/0085* (2013.01); *Y02P 70/56* (2015.11)

(56) References Cited

U.S. PATENT DOCUMENTS

| | | |
|---|---|---|
| 4,289,600 A | 9/1981 | Lazarz et al. |
| 4,663,012 A | 5/1987 | Giuffre et al. |
| 5,688,613 A * | 11/1997 | Li .................... H01G 9/025 252/62.2 |
| 2005/0158632 A1 | 7/2005 | Wang Chen et al. |
| 2008/0124604 A1 | 5/2008 | Moussaoui et al. |
| 2009/0306233 A1 | 12/2009 | Umemura et al. |
| 2010/0062313 A1 | 3/2010 | Browning et al. |
| 2010/0239921 A1 | 9/2010 | Fan |

FOREIGN PATENT DOCUMENTS

| | | | |
|---|---|---|---|
| WO | WO2012/045335 A1 | 4/2012 | |
| WO | WO 2012045335 A1 * | 4/2012 | .......... H01M 8/1018 |

OTHER PUBLICATIONS

Saner et al., Utilization of multiple graphene nanosheets in fuel cells: 2. The effect of oxidation process on the characteristics of graphene nanosheets, 2011, Fuel, 90, pp. 2609-2616.*

Egyizabal et al., "Novel hybrid membranes based on polybenzimidazole and ETS-10 titanosilicate type material for high temperature proton exchange membrane fuel cells: A comprehensive study on dense and porous systems", Journal of Power Sources, vol. 196, Issue 21, Nov. 1, 2011, pp. 8994-9007.

Merle et al., "Anion Exchange Membranes for Alkaline Fuel Cells: A Review", Journal of Membrane Science, vol. 377, Issues 1-2, Jul. 15, 2011, pp. 1-35.

Saner et al., "Utilization of multiple graphene nanosheets in fuel cells: 2. The effect of oxidation process on the characteristics of graphene nanosheets", Fuel, vol. 90, Issue 8, Aug. 2011, pp. 2609-2616.

Suryani, Ying-Ling Liu, "Preparation and properties of nanocomposite membranes of polybenzimidazole/sulfonated silica nanoparticles for proton exchange membranes", Journal of Membrane Science, vol. 332, Issues 1-2, Apr. 15, 2009, pp. 121-128.

Xing and Savadogo, "Hydrogenroxygen polymer electrolyte membrane fuel cells (PEMFCs) based on alkaline-doped polybenzimidazole (PBI)", Electrochemistry Communications, vol. 2, Aug. 2000, pp. 697-702.

International Search Report dated Nov. 12, 2013 on PCT/CA2013/050569.

* cited by examiner

HIGHLY ION-CONDUCTIVE NANO-ENGINEERED POROUS ELECTROLYTIC COMPOSITE MEMBRANE FOR ALKALINE ELECTROCHEMICAL ENERGY SYSTEMS

CROSS REFERENCE TO PRIOR APPLICATIONS

This application is a Continuation of PCT Patent Application Number PCT/CA2013/050569, filed Jul. 19, 2013, which claims priority under the Paris Convention to U.S. Application No. 61/741,456, filed Jul. 20, 2012. The entire contents of the aforementioned applications are incorporated herein by reference.

FIELD OF THE INVENTION

The present invention relates to the field of alkaline fuel cells, metal-air batteries and/or alkaline electrolyzers and their applications in energy conversion and storage devices. In particular, the invention relates to membranes for use in such devices.

BACKGROUND OF THE INVENTION

In electrochemical energy devices, the use of an alkaline medium is preferred over an acidic medium primarily due to the reduced corrosion of the components of the devices, the ease of their control and use, and the ability to use less expensive construction materials. Among alkaline electrochemical energy systems, alkaline fuel cells (AFCs), metal-air batteries (e.g., zinc-air battery), and alkaline electrolyzers have been found to be more favorable due to their advantages over other alternatives, such as their higher efficiency and reduced environmental hazard.

In AFCs, because of the alkaline medium, the reduction and oxidation kinetics of oxidants and fuels (e.g., air and hydrogen) are faster for cathode and anode electrodes, respectively, thereby enabling higher power densities. In addition, the ability of using non-precious metal electrocatalysts such as nickel and silver helps to reduce the costs of the AFCs. Moreover, the less corrosive nature of an alkaline medium increases the working lifespan of AFCs.

In metal-air batteries, different metals such as lithium, zinc, aluminum, magnesium, calcium, and iron can be used as the fuel. So far, zinc (Zn) has been considered as the most logical material for the anode in a metal-air battery. This is because of the slower corrosion rate of Zn in an alkaline solution, its high electropositivity, low cost, abundance, and high produced specific energy and power density when used in a cell. In an alkaline electrolyzer, electricity is used to split water at the cathode to produce hydrogen. The advantages of an alkaline electrolyzer are the feasibility of producing highly pure products (e.g., hydrogen) and working in low temperature and a less corrosive environment.

In all of the aforementioned systems, aqueous potassium hydroxide (KOH) is used as the electrolyte, wherein the produced hydroxide ions ($OH^-$) are conducted from the cathode to the anode. However, the existence of carbon dioxide ($CO_2$) in air causes a problem for such systems. Specifically, such $CO_2$ is absorbed by the KOH electrolyte and subsequently reacts with the mobile $OH^-$ ions, converting them to bicarbonate/carbonate ($CO_3^{2-}/HCO_3^-$) anions. Since $CO_3^{2-}/HCO_3^-$ are less mobile than $OH^-$ ions, there presence results in a dramatic decrease in ion conductivity through the electrolyte.

Previous approaches to address the abovementioned deficiencies have been reported in journal articles and patent publications. The most important approach to address the problem has involved the use of solid anion exchange membranes (AEMs) instead of liquid alkaline electrolytes. Merle G. et al. (Merle, G., M. Wessling, et al. (2011). "Anion exchange membranes for alkaline fuel cells: A review." *Journal of Membrane Science* 377(1): 1) reviewed numerous polymeric materials that are potentially suitable for use as an AEM and described their specific properties. However, the authors indicated that there is still a need to develop new AEMs that not only have a high ionic conductivity, but also exhibit desirable chemical stability at high pH and elevated temperatures. Various polymeric structures for AEMs, and the methods for preparing them, for use in AFCs, alkaline metal-air batteries, and alkaline electrolyzers, are disclosed in the following US Publications/Patents: 2010/0062313; U.S. Pat. No. 3,821,127; 2005/0158632; 2008/0124604; 20100239921; U.S. Pat. No. 4,663,012; and 20090306233. Nevertheless, these known membranes still lack high ionic-conductivity and durability.

Among the polymeric structures so far examined in the literature, poly[2,2'-(m-phenylene)-5,5'-bibenzimidazole], or polybenzimidazole (PBI), is found to be an inexpensive, amorphous homo-polymer, having outstanding physico-chemical and thermal stability properties. Xing et al. (Xing, B. and O. Savadogo (2000). "Hydrogen/oxygen polymer electrolyte membrane fuel cells (PEMFCs) based on alkaline-doped polybenzimidazole (PBI)." *Electrochemistry communications* 2(10): 697-702) have shown ionic conductivities with PBI between $5\times10^{-5}$ S/cm and $1\times10^{-1}$ S/cm for PBI using KOH with a concentration of 6 Mat 70-90° C. However, the high anion conductivity for PBI was only achieved at elevated temperatures. In U.S. Pat. No. 5,688,613 a hydroxide conductive electrolyte based on PBI was disclosed. Such PBI film, however, does not absorb water and therefore, does not hold water within the membrane, causing it to dry out quickly.

Despite the various proposed structures as discussed above, there remains a need for an AEM that addresses at least one of the deficiencies known in the art. For example, there exists a need for a cost effective AEM, possessing (i) improved anion conductivity, (ii) improved mechanical properties, and/or (iii) improved physico-chemical and thermal stability.

SUMMARY OF THE INVENTION

In one aspect, the invention provides an electrolytic membrane for use in alkaline electrochemical cells, the membrane comprising a porous polymeric material incorporating one or more nanomaterials.

In another aspect, the invention provide a method of forming an electrolytic membrane for use in alkaline electrochemical cells, the membrane comprising a porous polymeric material and one or more nanomaterials, the method comprising:
a) mixing a polymeric material with a porogen and the one or more nanomaterials;
b) hardening the mixture of (a) as sheet;
c) leaching the porogen from the sheet of step (b).

In one aspect, the present invention provides a highly ion-conductive nano-engineered porous electrolytic composite membranes for alkaline electrochemical systems, i.e., alkaline fuel cells, metal-air batteries, and electrolyzers. These novel membranes comprise (a) polybenzimidazole (PBI) as the polymeric backbone, (b) dibutyl phthalate (DBP) for introducing pores into PBI, (c) functionalized/non-functionalized hygroscopic titania nanotubes and graphene oxide nanosheets as the nanomaterials, or nano-fillers, and (d) potassium hydroxide electrolytic solution. The pores are formed by leaching out DBP, after making the membrane, comprised of nanomaterial and the porogen. The inorganic nanomaterials interconnect with the porous structure of polymer, which facilitates ion conduction through the membrane. Thus, the presence of inorganic nanomaterials, or nano-fillers, in the porous PBI, enhances performance and increases the physico-chemical stability of the membrane.

BRIEF DESCRIPTION OF THE DRAWINGS

The features of the invention will become more apparent in the following detailed description in which reference is made to the appended drawings wherein:

FIG. 3 also shows the EDX mapping of oxygen element from KOH in: b) bare PBI; d) 25 wt. %; f) 50 wt. %; and h) 70 wt. % porous PBIs.

DETAILED DESCRIPTION OF THE INVENTION

Figure 1:
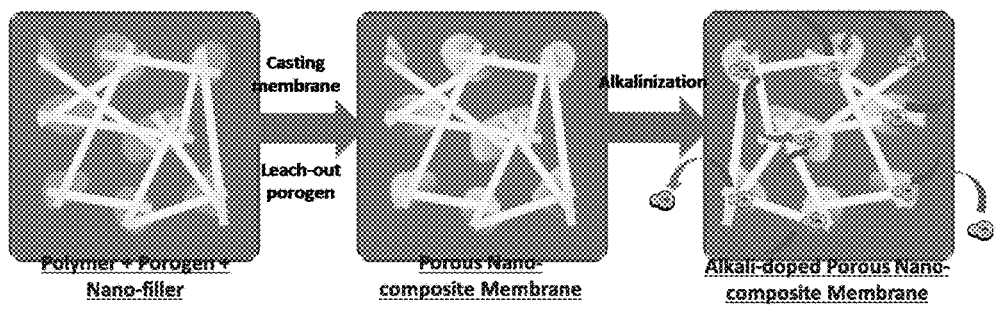
FIG. 1 shows the schematic of fabrication procedure of nano-engineered porous electrolytic composite membrane, which increases the ion-conduction.

The terms "comprise", "comprises", "comprised" or "comprising" may be used in the present description. As used herein (including the specification and/or the claims), these terms are to be interpreted as specifying the presence of the stated features, integers, steps or components, but not as precluding the presence of one or more other feature, integer, step, component or a group thereof as would be apparent to persons having ordinary skill in the relevant art.

Generally, according to one aspect, the present invention provides a nano-engineered, porous electrolytic composite membrane for use in alkaline energy conversion and storage devices such as AFCs, metal-air batteries, and electrolyzers. The invention also provides such storage devices incorporating the aforementioned membranes. The invention also provides methods for manufacturing the aforementioned membranes.

Generally, the membrane of the invention comprises a polymeric material that is treated first to increase its porosity. Subsequently, the material is treated to incorporate one or more nanomaterials (or nano-fillers) within the formed pores. The incorporation of such nanomaterials into the porous polymeric structure significantly increases the ion conductivity and alkaline stability of the electrolytic membranes of the invention.

In one aspect, the polymeric membrane material is provided with any desired degree or range of porosity. In one aspect, the porosity of the membrane may comprise up to about 70%. In one aspect, the porosity of the polymeric material is in the range of about 5-70%, including porosity ranges of about 5-25%, about 25-50% and about 50-70%. The pores provided in the membrane may also be of any desired size or range. In one aspect, the pores may have a mean size of up to about 500 nm. In one aspect, the mean pore size may range from about 200-500 nm.

The polymeric membrane can be provided with any desired thickness, as would be known to persons skilled in the art. In one aspect, the membrane can have a thickness of up to about 40 µm. In another aspect, the thickness of the membrane may range from about 15 to 40 µm.

In one aspect, the amount of nanomaterial within the pores of the polymeric membrane material is up to about 10 wt % of the membrane. In one aspect, the nanomaterial is in the range of about 2-10 wt % of the membrane.

Nano-structured inorganic oxides possess (i) good ion exchange capability as well as (ii) high thermo-physico-chemical stability, which are essential for energy conversion and storage systems. The introduction of porosity into the polymeric membranes creates more open paths and increases the surface area available for interconnection of the nano-fillers or materials, ion transfer and electrolytic solution affinity. One advantage of the present invention is that it allows water-retentive, nano-structured inorganic oxides to combine with the porous polymeric backbones, where they pass through the available pores, thereby (i) facilitating the mechanism of ion conduction, (ii) improving the thermo-physico-chemical stability of the membranes and thus, (iii) improving the performance of the electrochemical system as a whole.

According to one aspect of the invention, the polymeric backbone of the membrane comprises PBI, which has desirable physical and electrochemical properties. As discussed above, various deficiencies have been observed with prior art AEMs, including PBI. Our approach to overcome one or more of the aforementioned obstacles involves: (i) the modification of the polymeric membrane's morphology by increasing its porosity and (ii) the dispersion of either functionalized or non-functionalized hygroscopic inorganic nano-fillers (e.g., titania nanotubes, graphene oxide nanosheets etc.) into the porous polymer to form a nanocomposite porous membrane. The resulting porosity and incorporation of nanomaterials increases the attraction of electrolytic solutions (e.g., potassium hydroxide, KOH) as well as the density of ion-exchangeable sites. This not only intensifies the increase of ionic conductivity of the membrane, but also improves its physico-chemical stability and its mechanical properties when used in AFCs, metal-air batteries, or electrolyzers.

An unmodified PBI is an ionic and electronic non-conductor. However, because of the existence of amine (—NH—) and imide (—N) groups in the imidazole rings of PBI, it is an excellent ionic conductor after doping with strong alkaline (e.g., potassium hydroxide) or acidic (e.g., phosphoric acid) solutions, yet it keeps its electronic non-conductivity property after doping.

According to one aspect of the invention, the polymeric material, such as PBI is treated to increase its porosity using a plasticizer or porogen. As used herein, the term "plasticizer" or "porogen" indicates any material that is used to create pores or increases porosity in a substance. According to one aspect of the invention, the plasticizer or porogen used is dibutyl phthalate (DBP), which is a low molecular weight non-solvent compound. Although various porogens may be used in the invention, the use of DBP is preferred since its extraction from the polymeric material, such as PBI, is more efficient than that of other porogens, such as phosphates.

The inorganic nanomaterial used in the present invention may, for example, be based on either titania nanotubes ($TiO_2$-NT) and/or graphene oxide nanosheets (GO-NS), although other nanomaterials will be apparent to persons skilled in the art. In a preferred embodiment, the nanomaterials used in the membrane comprise a combination of $TiO_2$-NT and GO-NS. Titania nanotubes, $TiO_2$-NTs, which have one dimensional channels, possess high specific surface area and ion-changeable capabilities, thereby having the potential to enhance the performance and physical properties of the porous polymeric membranes of the invention. Likewise, the unique structure and high surface area of the GO-NSs, which have numerous oxygenated groups, provide more ion transport sites and intensify physico-chemical stability of the membrane.

To further improvement of ionic conduction and alkaline stability properties, the nanomaterials, such as $TiO_2$-NTs or GO-NSs, may be functionalized such as with anion-conductive organic compounds groups, thereby enabling more ion-exchange sites in the nano-composite membranes. The functionalization of nanomaterials or nanoparticles is well known in the art to enhance the action of such nanoparticles. In one aspect of the present invention, the nanomaterials may be functionalized by attaching ammonium groups to the surfaces thereof, as explained further below. Other means of functionalizing the nanomaterials would be apparent to persons skilled in the art having regard to the present specification.

In one embodiment, porous nano-composite PBI membranes are fabricated with different porosities and weight ratios of $TiO_2$-NTs or GO-NSs and then doped with potassium hydroxide (KOH) as the electrolytic solution. In the present description, the term "pPBI" will be used to represent the porous nano-composite PBI incorporating nanomaterials, such as $TiO_2$-NTs and/or GO-NSs.

In one embodiment, the porous nano-composite PBI membranes are fabricated with different porosities and weight ratios of ammonium-functionalized $TiO_2$-NTs or GO-NSs and then, ion-exchanged with hydroxide ($OH^-$). Dimethyloctadecyl[3-(trimethoxysilyl)propyl]ammonium chloride (DMOAP) was employed as the organic precursor to attach the ammonium functional group on the surface of the nanomaterial. It will be understood that other means may be used to attach ammonium functional groups to (i.e. functionalize) the nanomaterials.

The porous nano-composite PBIs were compared to the commercial fumapem® FAA from FuMA-Tech GmbH, which is an AEM, made of quaternized polyarylene (polysulfone). All membranes were characterized, using different spectroscopic and microscopic analysis methods, including scanning electron microscopy (SEM), transmission electron microscopy (TEM), proton nuclear magnetic resonance (1H NMR), Fourier transform infrared (FT-IR), thermogravimetric analysis (TGA), mechanical properties, water affinity and electrochemical impedance spectroscopy (EIS).

Summary of Features

Thus, as would be understood from the present specification, the present invention provides a nano-engineered porous electrolytic composite membrane for use in alkaline electrochemical energy systems, specifically, alkaline fuel cells (AFCs), metal-air batteries, and alkaline electrolyzers. The porous structure of polymeric membrane interconnects with nanomaterials, such as nano-inorganic oxides, which facilitate ion conduction through the membrane. This not only intensifies the increase of ionic conductivity of the porous PBI membrane in a wide range of operating temperatures, but also improves its physico-chemical stability and mechanical properties in harsh environments of such systems.

The nano-engineered porous electrolytic composite membrane of the invention preferably comprises a polymeric "backbone" of polybenzimidazole (PBI). In a preferred embodiment, the porous membrane is formed by combining the polymeric backbone with a plasticizer or porogen, more preferably, using dibutyl phthalate (DBP), which is a non-solvent material. The pores are created by leaching out the porogen.

The inorganic oxide materials used may comprise titania nanotubes, which benefit the enhancement of performance and physico-chemical stability of the porous PBI membrane, and/or graphene oxide nanosheets, which benefit the enhancement of performance and physico-chemical stability of the porous PBI membrane. More preferably, the inorganic oxide nanomaterials are ammonium-functionalized titanium oxide nanotubes. Such functionalization may be accomplished using, for example, Dimethyloctadecyl[3-(trimethoxysilyl)propyl]ammonium chloride (DMOAP) as an organic precursor to attach the ammonium functional group to the titanium oxide nanotubes.

Similarly, the inorganic oxide nanomaterial may preferably comprise ammonium-functionalized graphene oxide nanosheets. More preferably, such functionalization may be accomplished using Dimethyloctadecyl[3-(trimethoxysilyl)propyl]ammonium chloride (DMOAP) as the organic precursor to attach the ammonium functional group to the graphene oxide nanosheets.

The nano-engineered porous electrolytic composite membranes of invention may be used in alkaline electrochemical energy systems, such as alkaline fuel cells (AFCs), metal-air batteries, and alkaline electrolyzers.

EXAMPLES

Aspects of the invention will now be illustrated with reference to the following examples. It will be understood that the scope of the invention is not to be limited by the following examples.

Example 1

In this example, the PBI, $TiO_2$-NTs, GO-NSs, and ammonium-functionalized nanomaterials, or nano-fillers, were produced. First, the PBI itself was synthesized. Equal amounts (in moles) of 3,3'-Diaminobenzidine (DAB) (Aldrich) and Isophthalic acid (IPA) (Aldrich) were dissolved in polyphosphoric acid (PPA) (Alfa Aesar) in a round-bottom flask. After stirring for 7 h at 200° C., the reaction mixture turned dark brown and became viscous. The reaction was quenched by pouring the hot solution into a large amount of cold water. The formed PBI fibers were stirred and washed for 48 h in water and 7 h in a 10% KOH solution, and then dried in an oven at 100° C. overnight. The successful synthesis of PBI was shown and confirmed by proton nuclear magnetic resonance spectroscopy (1H NMR, 500 MHz, Bruker Analytik GmbH), shown in FIG. 2a.

Figure 2:
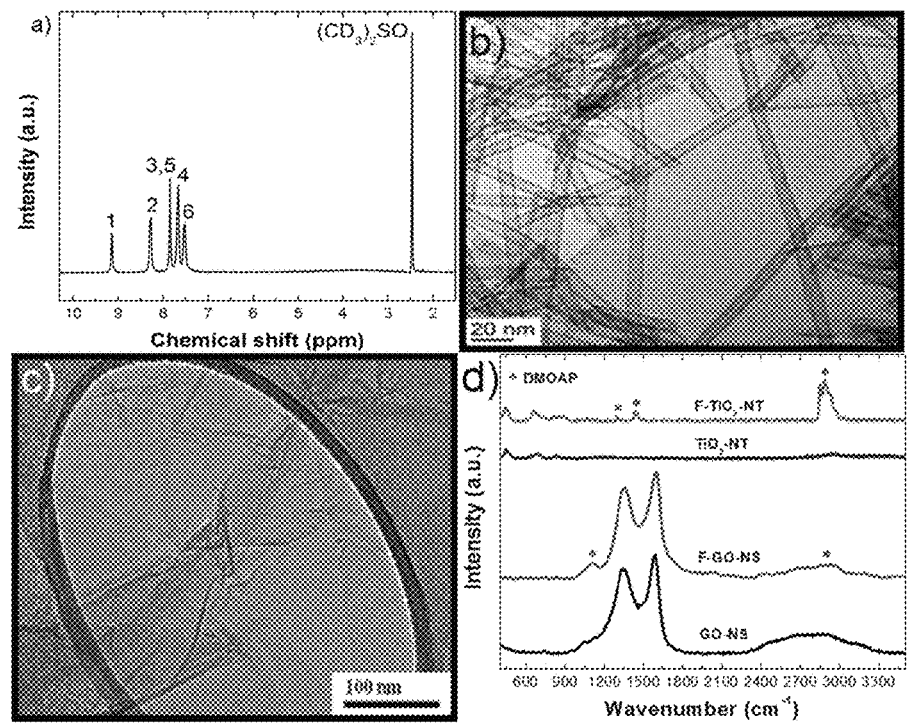
FIG. 2 shows: a) the proton chemical shifts in PBI ($^1$H NMR (Bruker 500 MHz, $(CD_3)_2SO$), $\delta H$, which are 9.14 ($H_1$), 8.28 ($H_2$), 7.85 ($H_3$), 7.8 ($H_5$), 7.67 ($H_4$), 7.53 ($H_6$); b) TEM image of $TiO_2$-NT; c) TEM image of GO-NS; and, d) Raman spectrum of $TiO_2$-NT, F—$TiO_2$-NT, GO-NS, F-GO-NS.

$TiO_2$-NTs were prepared by the alkaline hydrothermal method. First, an appropriate amount of titania nanoparticle ($TiO_2$-NP; <25 nm) was mixed into a 10 M NaOH solution. The resulting mixture was stirred and ultrasonicated for several minutes before pouring the solution into a stainless steel/Teflon® autoclave, which was heated for 48 h at 140° C. The solution was then washed and filtered with deionized water, washed with 0.1 M HCl and dried overnight. An appropriate amount of dried powder sample, in the protonated form, was placed in 6 M KOH solution under vigorous stirring to obtain potassium-ion exchanged $TiO_2$-NT. The morphology of $TiO_2$-NT was confirmed by TEM, as shown in FIG. 2b.

GO-NSs were produced from natural graphite flakes by the modified Hummer's method. Graphite powder (2 g) and sodium nitrate ($NaNO_3$, 1 g) were combined in a round-bottom flask. Concentrated sulfuric acid ($H_2SO_4$, 46 mL) was added while stirring in an ice bath at 0° C. Potassium permanganate ($KMnO_4$, 6 g) was added very slowly because it is a strong oxidizing agent. The flask was removed from the ice bath and stirred for 1 h at room temperature. Distilled deionized water (DDI, 92 mL) was then added drop by drop, generating a significant amount of heat and gas. After further stirring for 30 min, the reaction mixture was diluted with warm DDI water (280 mL), and 30% hydrogen peroxide ($H_2O_2$, 40 mL) was added to neutralize any remaining permanganate. The product was then filtered and washed with copious amounts of 5% hydrochloric acid (HCl), after which it was centrifuged several times until the excess HCl was removed, collected by filtration, and dried in an oven at 70° C. overnight. The morphology of GO-NS was confirmed by TEM, as shown in FIG. 2c.

Ammonium-functionalization of $TiO_2$-NT and GO-NS was proceeded through the suspension of the nanomaterials in water, followed by addition of DMOAP, dispersed in ethanol. The mixture was stirred at room temperature for 24 h. The product was centrifuged several times after washing with DDI water and ethanol and then, freeze-dried. The successful functionalization was shown and confirmed by Raman spectroscopy (Bruker), as shown in FIG. 2d.

Example 2

Figure 3:
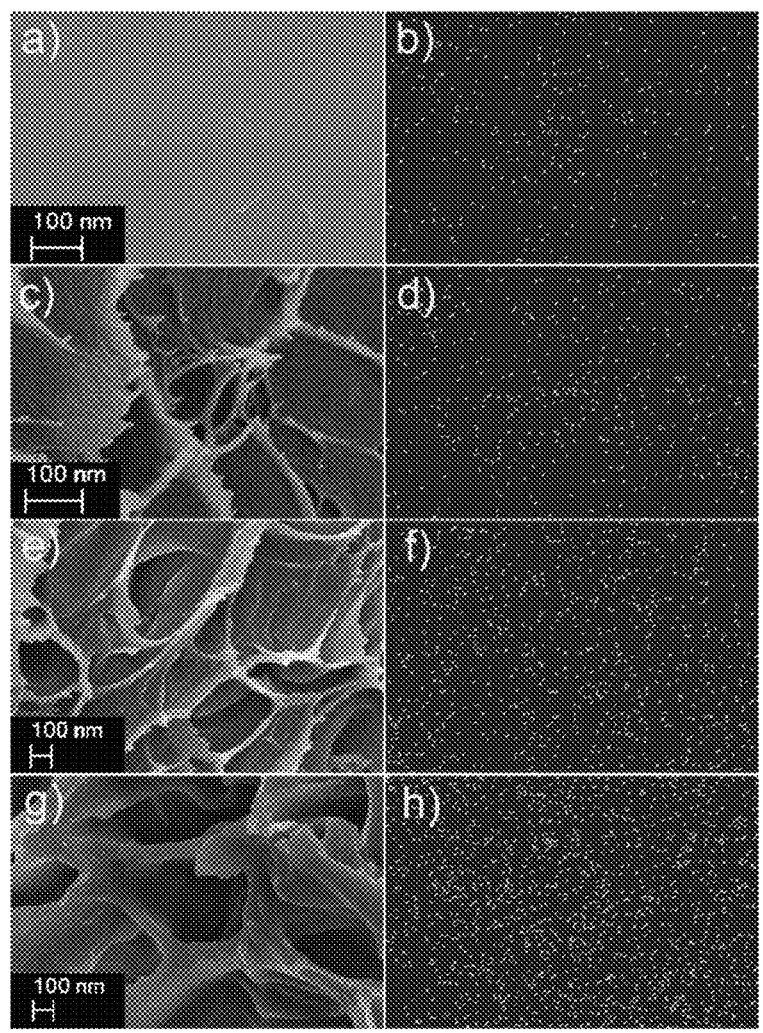
FIG. 3 shows: (A) the cross-sectional images from SEM of: a) bare PBI; c) 25 wt. %; e) 50 wt. %; and g) 70 wt. % porous PBI membranes.

In this example the porous nano-composite PBI membranes were fabricated with different porosities and weight ratios of either non-functionalized or ammonium functionalized $TiO_2$-NTs and GO-NSs. Appropriate amounts of the dried PBI polymer was dissolved in dimethyl sulfoxide (DMSO) under stirring and heating until an orange homogeneous solution was obtained. Then, the porogen DBP and the dispersed nanomaterials in DMSO were added. The uniform solution was spread onto a glass plate and placed in an oven at 60° C. for 2 days. After the formation of membrane, DBP was extracted by immersing the membranes in methanol for 1 h. The porous nano-composite PBIs were vacuum-dried at 50° C. until constant weight was achieved. Then, all membranes were doped and ion-exchanged with KOH by immersion in 6 M alkaline solution for 2 days and finally, stored in DDI water until future characterization tests. The cross-sectional images from SEM (LEO FESEM 1530) and EDX mapping of oxygen for the bare and porous nano-composite PBI membranes with various porosities are shown in FIG. 3. In FIGS. 3a, c, e, and g the effect of the porogen amount on the morphology of the membranes was studied. The bare PBI possesses no pores; whereas the open pores could be observed in all of the porous membranes that were formed. It is seen that a higher amount of DBP led to a larger pore size after removal of DBP from the membrane, such that at the porosity level of 25 wt. %, 50 wt. %, and 70 wt. % the pore size on average was about 253 nm, 300 nm, and 467 nm, respectively. FIGS. 3b, d, f, and h illustrate the EDX mappings of oxygen. It is clearly seen that the density of oxygen from KOH increases with increasing the porosity from 0 wt. % to 70 wt. % in the PBI membranes.

Example 3

Figure 4:
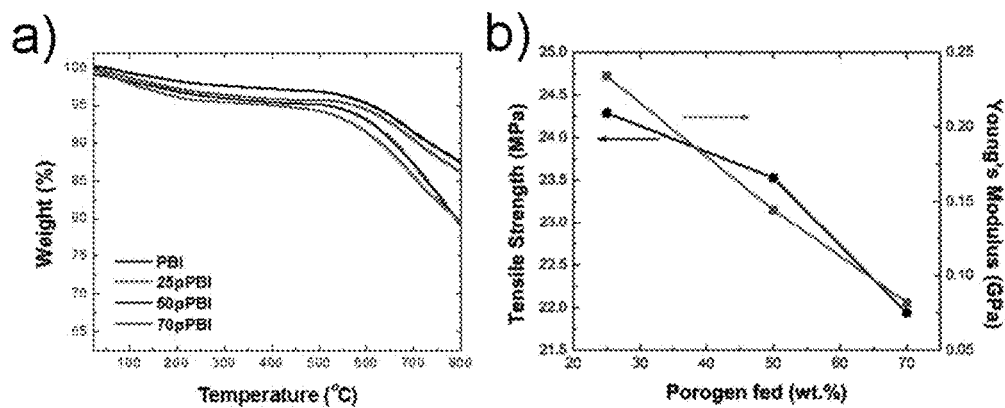
FIG. 4 shows the effect of porosity on a) the TGA and DTA and b) the tensile strength and Young modulus.

The thermal stability and mechanical properties of porous nano-composite PBIs were estimated using thermogravimetric analysis (TGA, Q500 V20.10) and tensile machine (Admet eXpert™ 7603 series), respectively, as illustrated in FIGS. 4a and 4b. Generally, the increase of porosity has a slight effect on the thermal stability of the membrane. According to TGA-DTA curves, the initial weight loss below 200° C. can be attributed to the loss of unvaporized-bound water in PBI membranes, which changed from 2% to 5% by increasing the porosity from 0 wt. % to 70 wt. %. This indicated that because of the higher water affinity of porous PBI, more unvaporized-bound water existed in the membranes with higher porosity. From 200° C. to 500° C. the trend of weight change was almost close to a flat phase. The degradation temperature was started after 500° C. for all PBI membranes. Based on TGA-DTA curves, the increase of porosity from 0 wt. % to 70 wt. % caused the final weight loss to increase from 12% to 20% at 800° C. In general, all porous PBI membranes exhibited excellent thermal stability. It is observed in FIG. 4b that the increase of porosity in the PBI membrane decreased the tensile strength about 9%; whereas this weakening effect on Young's modulus was 66.67%. This could be attributed to the plasticizing effect of increasing the porosity. Generally, the porous nano-composite PBI membranes showed satisfactory mechanical properties to be used in alkaline electrochemical energy devices.

Example 4

Figure 5:
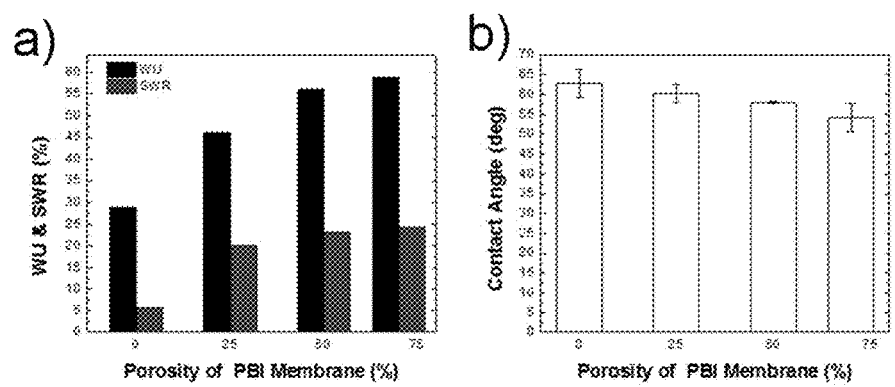
FIG. 5 shows the effect of porosity on a) the water uptake and swelling ratio and b) contact angle of water on the surface of membranes.

FIG. 5a represents the water uptake (WU) and swelling ratio (SWR) of porous nano-composite PBI membranes and the water contact angle is exhibited in FIG. 5b. To calculate the WU and SWR, the dried membranes were immersed in DDI water at room temperature for 48 h. After hydration, the surface water was wiped with tissue paper before weighing. Then, the membranes were fully dried in a vacuum oven at 50° C. for 48 h and weighed. The weight and dimensions of samples were measured several times until constant numbers were achieved. Then, WU and lengthwise SWR were calculated by following equations:

$$WU(\%) = \frac{W_w - W_d}{W_d} \times 100 \quad \text{(Equation 1)}$$

$$SWR(\%) = \frac{L_w - L_d}{L_d} \times 100 \quad \text{(Equation 2)}$$

where $W_d$, $L_d$, $W_w$, and $L_w$ are dry weight, dry length, wet weight, and wet length of the samples, respectively.

According to FIG. 5a, The results show that by increasing the porosity from 0 to 70 wt. %, the KOH uptake and water uptake were increased about 60% and 53%, respectively.

However, the enhancement of water affinity with the introduction of a porous structure has caused larger lengthwise swelling ratios. This was further improved by testing the water contact angle, shown in FIG. 5b. As the decrease of angle represents higher hydrophilicity, it could be concluded that higher porosity introduced into the structure of the polymer has assisted with the larger absorption of water in porous PBI membranes.

Example 5

The ion conductivity of all membranes was characterized in in-plane direction of the membranes, using AC impedance spectroscopy with a Princeton Versastat MC potensiostat, and a simple home-made four-point cell made from four stainless-steel strips and Teflon® plates. The outer stripes were the current source and sink, while the inner ones (reference electrodes) were used for the voltage measurements. The impedance was measured in the frequency range between 1 MHz and 0.1 kHz with perturbation voltage amplitude of 10 mV. The cell was placed in a thermo-controlled chamber in DDI water for measurement. All samples were equilibrated in water for at least 24 h prior to the conductivity measurement. At a given temperature, the samples were equilibrated for at least 30 min before any measurements. Repeated measurements (at least three times) were then taken at that given temperature with 10 min intervals until no more change in conductivity was observed. The hydroxide conductivity ($\sigma$) of all samples was then determined along the longitudinal direction, using equation 3:

$$\sigma = \frac{L}{RA} \quad \text{(Equation 3)}$$

Figure 6:
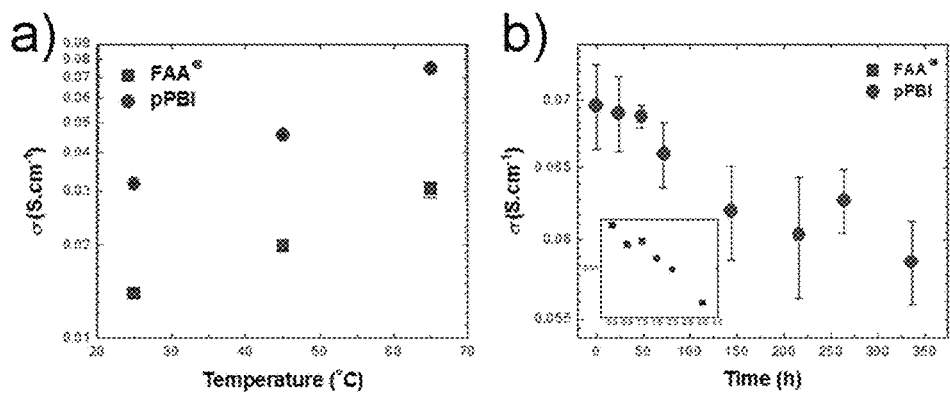
FIG. 6 shows the effect of porosity on a) hydroxide conductivity at 100% relative humidity and different temperatures, compared to a commercial FAA membrane and b) electrochemical stability after 350 h, at 100% relative humidity and 65° C. The membranes are characterized after boiling in 6M KOH solution.
Figure 7:
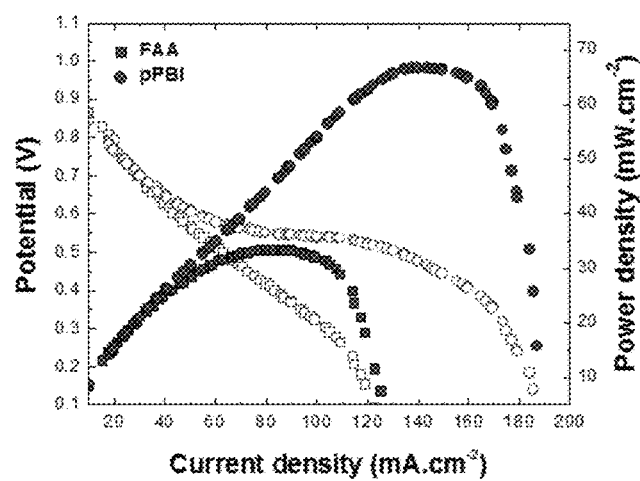
FIG. 7 shows the effect of porosity on the single-cell polarization and power density, compared to a commercial FAA membrane.

FIG. 6a shows the enhancement of ionic conductivity at different temperatures for porous nano-composite PBI membrane. The results are also compared to the commercially available FAA membrane. In comparison to the commercial FAA membrane, the nano-composite porous PBI exhibited higher ionic conductivity at all temperatures. At room temperature, the hydroxide conductivity increased from 14 mS/cm, obtained for FAA, to 33 mS/cm, measured for the porous nano-composite PBI. The maximum hydroxide conductivity was achieved at 65° C. which was 75 mS/cm for pPBI. This indicates that the concentrated KOH adsorbs better inside the porous nano-composite membrane along with the more available ion-exchange sites, provided by nanomaterials, leading to a higher water uptake and therefore to a higher ionic conductivity.

In FIG. 6b, the electrochemical stability of the porous nano-composite PBI was compared to the commercial FAA membrane. To test this property, all membranes were heated in a boiling 6 M KOH solution for a specific duration of time, from 1 h to 350 h. Then the ionic conductivity was re-tested for alkaline-treated membranes at 65° C. The commercial FAA membrane degraded just after 3 h and its conductivity decreased dramatically. However, for porous nano-composite PBI a slight decrease of conduction occurred after 350 h and the membrane retained its ion conduction capability, around 60 mS/cm.

Example 6

The alkaline fuel cell performance of pPBI was compared to the commercial FAA membrane in a fuel cell setup using a single cell membrane electrode assembly (MEA) setup. The electrocatalyst used in the anode and cathode layers was Pt/C (28.2 wt. % Pt, TKK Corp.). Catalyst-containing inks were prepared by mixing and ultrasonicating the catalyst with isopropanol for 1 h. The inks were sprayed on as a gas diffusion layer (GDL, SIGRACET® GDL 10 BB) and dried in oven at 80° C. for 24 h. This process was repeated until the desired catalyst loading (0.5 mg/cm) was achieved for both anode and cathode. The MEA with an active electrode area of 5 cm2 was obtained by hot-pressing the cathode and anode onto each side of the membrane. For each sample, the MEA was assembled into the fuel cell hardware (850e Multi-Range Fuel Cell Test System, Scribner Associates) with a gas flow rate of 0.2 L/min for both hydrogen and oxygen.

FIG. 8 displays the polarization and power density plot of pPBI membrane and FAA in a fully humidified $H_2/O_2$ MEA single-cell system, operating at 65° C. The peak power density for pPBI was about 70 mW/cm$^2$, two times higher than that of commercial FAA (33.4 mW/cm$^2$). These results are in direct agreement with the membrane ionic conductivity analysis, as pPBI displayed a substantial performance increase through MEA testing compared with the commercial FAA under typical AEMFC conditions. Likewise, according to the polarization curves, at a cell voltage of 0.6 V, the current density of FAA and pPBI were 43.3 and 92.3 mA/cm$^2$, respectively, indicating that ionic conductivity improvement by porous nano-composite membrane has significantly decreased the ohmic overpotential. Clearly, porous nano-composite membranes offer significant promise as electrolytic membranes for AFC applications, owing to their beneficial structure and electrochemical properties.

Although the invention has been described with reference to certain specific embodiments, various modifications thereof will be apparent to those skilled in the art. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The scope of the claims appended hereto should not be limited by the preferred embodiments set forth in the above description, but should be given the broadest interpretation consistent with the present specification as a whole. The disclosures of all prior art recited herein are incorporated herein by reference in their entirety.

We claim:

1. A method of forming a hydroxide-conductive nano-composite electrolytic membrane for use in a solid-state alkaline electrochemical cell, the membrane comprising a porous polymeric material and one or more nanomaterials, the nanomaterials comprising hydroxide-conductive titania nanotubes and/or graphene oxide nanosheets, the method comprising:
   a) ammonium-functionalizing the nanomaterials by treating the nanomaterials with dimethyloctadecyl [3-(trimethoxysilyl)propyl] ammonium chloride (DMOAP);
   b) mixing a polymeric material with a porogen and the one or more nanomaterials;
   c) hardening the mixture of (b) as a sheet;
   d) leaching the porogen from the sheet of step (c).

2. The method of claim 1, further comprising doping the sheet of (d) to exchange undesirable ions in ion-conducting sites of the membrane with hydroxides.

3. The method of claim 1, wherein the polymeric material is polybenzimidazole (PBI).

4. The method of claim 1, wherein the nanomaterials comprise inorganic oxide materials.

5. The method of claim 4, wherein the nanomaterials are functionalized.

6. The method of claim 1, wherein the porogen is dibutyl phthalate (DBP).

7. The method of claim 1, wherein the electrochemical cell is an alkaline fuel cell (AFC), a metal-air battery, or an alkaline electrolyzer.

* * * * *